United States Patent
Foster

(10) Patent No.: US 8,330,817 B1
(45) Date of Patent: Dec. 11, 2012

(54) CAMERA INSTALLATION FOR TRAILER

(75) Inventor: Robert Foster, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 1190 days.

(21) Appl. No.: 12/169,445

(22) Filed: Jul. 8, 2008

(51) Int. Cl.
- *H04N 7/18* (2006.01)
- *B60J 5/00* (2006.01)
- *G03B 13/00* (2006.01)
- *G08B 13/00* (2006.01)
- *B60P 1/00* (2006.01)

(52) U.S. Cl. .............. 348/148; 296/186.1; 396/427; 340/541; 298/24

(58) Field of Classification Search ........... 348/148, 348/151
See application file for complete search history.

(56) References Cited

U.S. PATENT DOCUMENTS

| | | | |
|---|---|---|---|
| 1,088,347 A | 2/1914 | Koehler | |
| 2,022,869 A | 12/1935 | Reid | |
| 2,185,209 A | 1/1940 | Love | |
| 2,561,098 A | 7/1951 | Cole | |
| 2,679,431 A | 5/1954 | Wineman, Jr. | |
| 3,103,379 A | 9/1963 | Stone et al. | |
| 3,405,778 A | 10/1968 | Martin | |
| 3,493,263 A | 2/1970 | Brown | |
| 3,961,323 A | 6/1976 | Hartkorn | |
| 4,049,311 A | 9/1977 | Dietrich et al. | |
| 4,080,906 A | 3/1978 | Brown | |
| 4,182,532 A * | 1/1980 | Walker, Sr. .............. | 296/210 |
| 4,385,856 A * | 5/1983 | O'Neal .............. | 410/34 |
| 4,498,824 A | 2/1985 | Kinkle | |
| 4,743,151 A | 5/1988 | Haberkorn | |
| 4,986,706 A | 1/1991 | Williams, Jr. | |
| 5,027,104 A * | 6/1991 | Reid .............. | 340/541 |
| 5,058,924 A | 10/1991 | Whatley, Jr. | |
| 5,346,233 A | 9/1994 | Moser | |
| 5,418,038 A | 5/1995 | Wise et al. | |
| 5,472,300 A | 12/1995 | Lipschitz | |
| 5,577,522 A | 11/1996 | Barkley et al. | |
| 5,628,541 A | 5/1997 | Gardner | |
| 5,697,742 A | 12/1997 | House | |
| 5,735,639 A | 4/1998 | Payne et al. | |
| 5,791,726 A | 8/1998 | Kaufman | |
| 6,019,432 A * | 2/2000 | Bonerb .............. | 298/24 |
| 6,043,661 A | 3/2000 | Gutierrez | |
| 6,139,091 A | 10/2000 | Shultz | |
| 6,151,065 A * | 11/2000 | Steed et al. .............. | 348/148 |

(Continued)

FOREIGN PATENT DOCUMENTS

DE    43 14 093    1/1994

(Continued)

OTHER PUBLICATIONS

Foster, R., U.S. Appl. No. 12/169,398, filed Jul. 8, 2008, "Sting Trailer".

(Continued)

*Primary Examiner* — Phuoc Nguyen
*Assistant Examiner* — Kishin G Belani
(74) *Attorney, Agent, or Firm* — Merek, Blackmon & Voorhees, LLC

(57) ABSTRACT

A sting trailer has a camera scaffold concealing hidden cameras in a cargo compartment of the trailer. The camera scaffold conceals cameras and wiring so that the cameras are not visible from the interior of the trailer.

18 Claims, 4 Drawing Sheets

U.S. PATENT DOCUMENTS

| | | | |
|---|---|---|---|
| 6,259,475 B1 * | 7/2001 | Ramachandran et al. | 348/148 |
| 6,276,736 B1 | 8/2001 | Cook et al. | |
| 6,626,622 B2 | 9/2003 | Zubko | |
| 6,793,271 B1 | 9/2004 | Deets | |
| 6,827,534 B2 | 12/2004 | Onken | |
| 7,014,253 B2 | 3/2006 | Oren | |
| 7,413,357 B2 * | 8/2008 | Badalian | 396/427 |
| 7,946,644 B1 | 5/2011 | Foster | |
| 7,959,215 B2 | 6/2011 | Boutin et al. | |
| 2002/0158968 A1 | 10/2002 | Leitgeb | |
| 2004/0119822 A1 | 6/2004 | Custer et al. | |
| 2005/0068417 A1 | 3/2005 | Kreiner et al. | |
| 2007/0284912 A1 * | 12/2007 | Klein | 296/186.1 |
| 2007/0285270 A1 | 12/2007 | Gunn et al. | |
| 2008/0131226 A1 | 6/2008 | Pesson | |
| 2009/0027498 A1 * | 1/2009 | Owen et al. | 348/151 |
| 2009/0129112 A1 | 5/2009 | Shamitz et al. | |
| 2009/0174989 A1 | 7/2009 | Nagel et al. | |
| 2009/0230644 A1 | 9/2009 | Stanley | |

FOREIGN PATENT DOCUMENTS

| | | |
|---|---|---|
| EP | 0 044 746 | 1/1982 |
| EP | 0 146 465 | 6/1985 |
| EP | 0 278 558 | 8/1988 |
| FR | 2 635 737 | 3/1990 |
| WO | WO 86/02605 | 5/1986 |

OTHER PUBLICATIONS

Foster, R., U.S. Appl. No. 12/169,422, filed Jul. 8, 2008, "Semi Trailer with External Switch".

Prosecution History of U.S. Appl. No. 12/169,398, filed Jul. 8, 2008 and issued as U.S. Patent No. 7,946,644 on May 24, 2011.

Prosecution History of U.S. Appl. No. 12/169,422, filed Jul. 8, 2008 presently pending.

Prosecution History of U.S. Appl. No. 13/087,784, filed Apr. 15, 2011 presently pending.

* cited by examiner

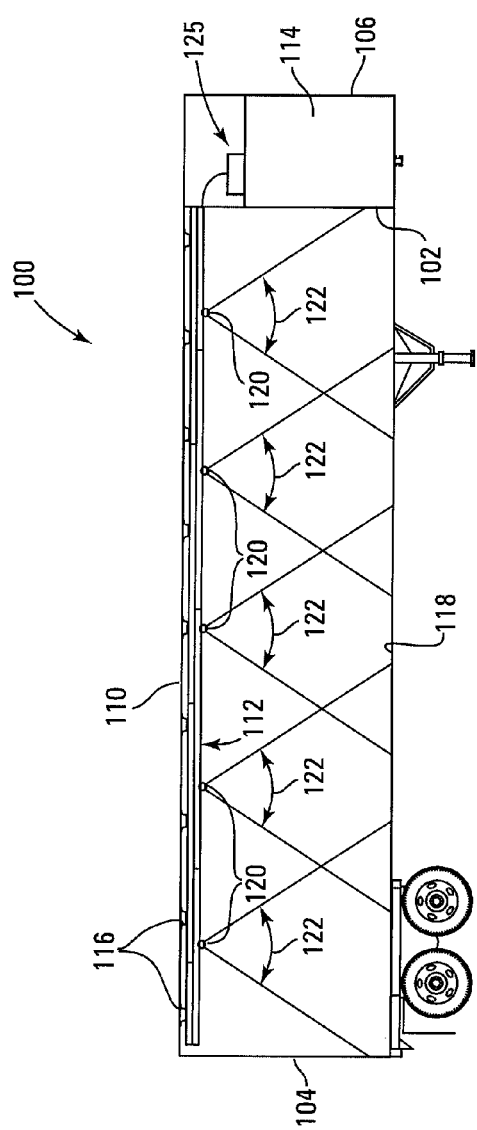
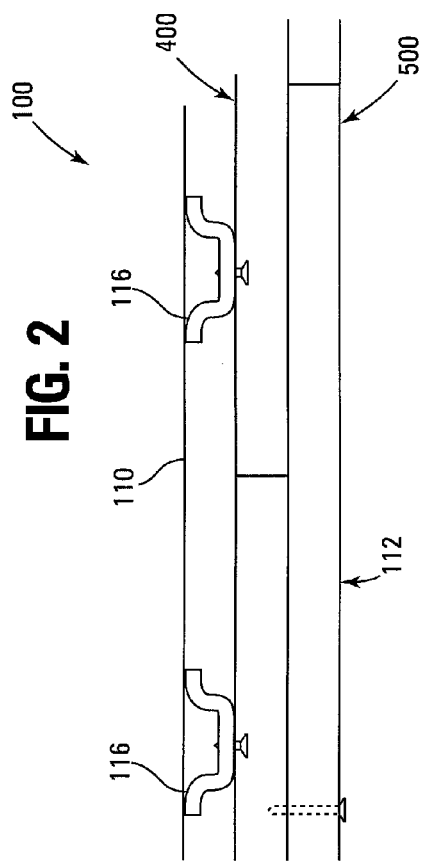

CAMERA INSTALLATION FOR TRAILER

FIELD

The present disclosure relates generally to semi-trailer surveillance and, in particular, the present disclosure relates to camera installations for sting trailers.

BACKGROUND

Cargo theft from cargo transportation containers, such as semi-trailers, is prevalent. Thefts can occur when a semi-trailer is left unattended, such as when the semi-trailer is parked at a rest-stop. Thefts may be perpetrated by employees of a receiver of the cargo as the employees unload the cargo. Thefts may also be perpetrated by the driver of the tractor that tows the semi-trailer.

To apprehend and prosecute thieves of cargo from semi-trailers, some semi-trailers are equipped with surveillance equipment, such as cameras, microphones, global positioning equipment, etc. Such semi-trailers are sometimes referred to as "sting trailers." The surveillance equipment typically transmits signals to monitoring and recording equipment located at a remote site, such as a surveillance vehicle. Monitoring and recording equipment may also be located on board the sting trailer as part of the surveillance equipment.

Sting trailers are designed to simulate an actual semi-trailer so as to avoid arousing the suspicion of would-be thieves. Therefore, surveillance equipment is usually hidden within the sting trailer. For example, monitoring and recording equipment, cameras, microphones, global positioning equipment, power supplies, etc. may be hidden in a hidden compartment located near the front of the sting trailer between a false end-wall and the actual front end-wall.

One problem with cameras in sting trailers is that if the cameras can be seen from within the trailer, would-be thieves will likely know immediately that their activity may be monitored, increasing the risks of detection of the theft and identification of the thieves.

Many trailer manufacturers allow a top construction of a translucent or light admitting roof, such as that sold under the brand name KEMLITE® which allows light into the trailer. In loading a trailer, it is most cost-efficient to load as much cargo into the trailer as possible, so trailers are often stacked right up to or very near the top of the trailer. In stacking in such a fashion, it can become difficult to avoid breaking or damaging the roof. The roof material can be somewhat fragile and prone to breakage if struck by a loader or cargo during loading. For this reason, many trailer operators have begun to install wooden guards, such as plywood or the like, at the top of the trailers to protect the roof from damage.

For the reasons stated above, and for other reasons stated below which will become apparent to those skilled in the art upon reading and understanding the present specification, there is a need in the art for camera concealment and placement within sting trailers.

SUMMARY

One embodiment of the present invention provides a sting trailer having a translucent roof portion admitting light to the trailer, and a guard element to protect the roof portion. The guard element contains at least one concealed camera and wiring for the camera.

In another embodiment, a sting trailer includes a hidden compartment containing surveillance equipment, a cargo-carrying compartment having a roof, and a camera platform mounted to the roof, the camera platform concealing a number of cameras connected to the surveillance equipment.

In still another embodiment, a method of constructing a sting trailer includes adjoining a top portion and a bottom portion of a camera platform having a number of internal channels and a number of internal camera placements connected to the internal channels, mounting a camera in one or more of the internal camera placements, and routing wiring for each camera through one of the internal channels to an external camera controller.

BRIEF DESCRIPTION OF THE DRAWINGS

FIG. 1 is a side cutaway view of an embodiment of a sting trailer, according to an embodiment;

FIG. 2 is an expanded view of a portion of the embodiment of FIG. 1;

DETAILED DESCRIPTION

Figure 3:
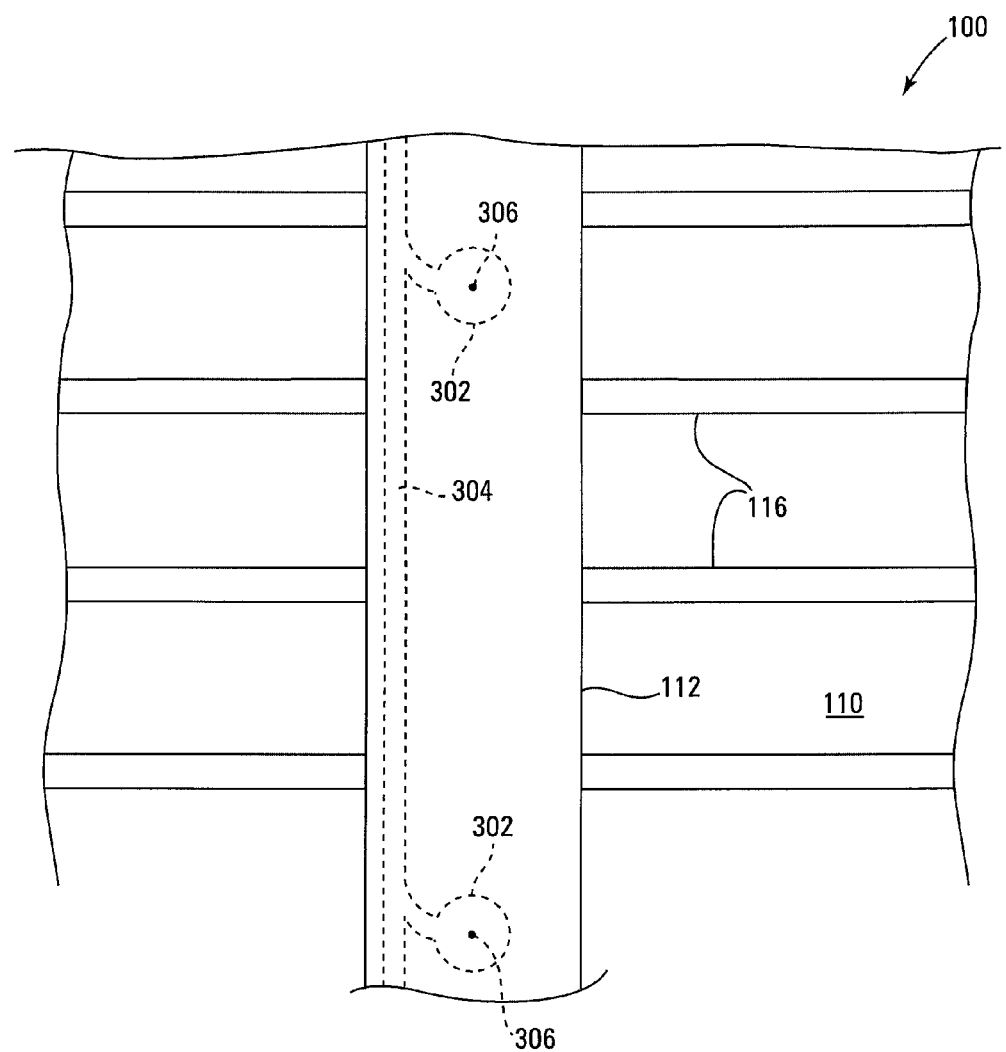
FIG. 3 is a view from inside a trailer looking up at a portion of a roof and scaffold according to another embodiment.

In the following detailed description, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural changes may be made without departing from the scope of the present disclosure. The following detailed description is, therefore, not to be taken in a limiting sense, and the scope of the present disclosure is defined only by the appended claims and equivalents thereof.

The embodiments of the present disclosure provide a semi-trailer with concealed camera placements that appear to be normal parts of a normal trailer. The camera placements are located within pieces of the trailer that are present in many trailers, and do not arouse suspicion. Because cameras are difficult to hide in trailers since nearly all available room in the trailer is designed for cargo carrying, the embodiments of the present disclosure are less likely to be spotted than traditional camera placements.

Figure 6:
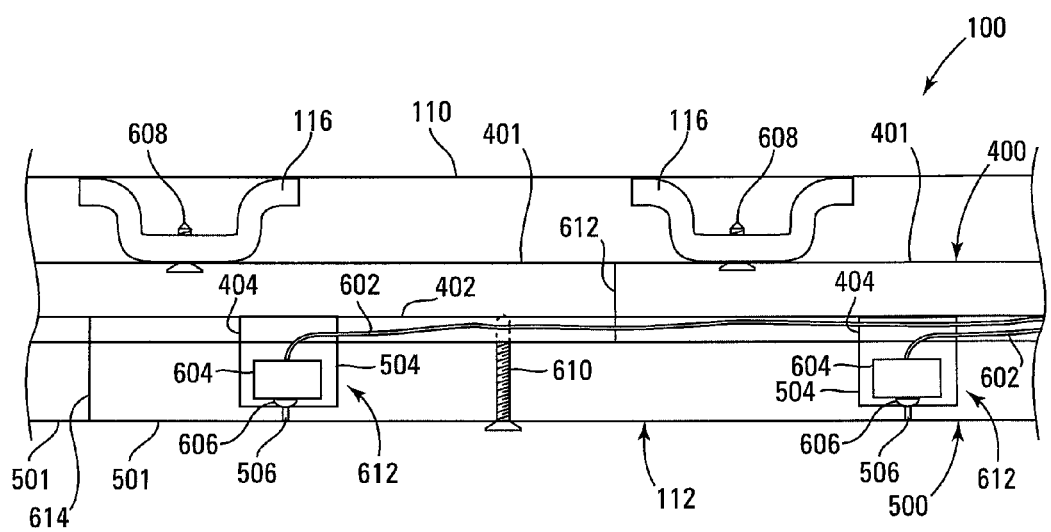
FIG. 6 is a side cutaway view of the top and bottom portions of the camera scaffold of FIGS. 4 and 5 joined together.

FIG. 1 is a side cutaway view of a sting trailer 100, e.g., configured to operate as a semi-trailer, having a sidewall removed to reveal the interior of sting trailer 100. At its exterior, sting trailer 100 appears to be a conventional semi-trailer. In one embodiment, a false front end-wall 102 is located between the rear 104 and a true front end-wall 106 (e.g., sometimes called the nose of the trailer) of the trailer 100. Trailer 100 has in this embodiment a translucent or light admitting top 110 protected by a mounted guard or scaffold 112. The top 110 is protected by the scaffold 112. Scaffolds such as scaffold 112 are typically made of wood such as plywood, and are mounted to ribs 116 of the trailer 100 as shown in FIG. 6 and described below.

Sting trailer 100 in one embodiment has a hidden compartment 114 located between front end-wall 106 and false end-wall 102. For one embodiment, hidden compartment 114 contains a surveillance setup 125, including by way of example and not by way of limitation, monitoring and recording equipment, microphones, global positioning equipment, power supplies, cabinets and enclosures for electrical equipment, access routers, rechargeable and/or non-rechargeable batteries, external camera controllers, etc. In one embodiment, the scaffold 112 has cameras mounted therein that are not visible from the interior of the trailer 100. In this embodiment, described in further detail below, the cameras and their associated wiring are concealed within the scaffold 112.

In the various embodiments, cameras and the wiring for the cameras are concealed within the scaffold 112, which is typically found as an aftermarket part in trailers having a translucent or light admitting top portion. The translucent or light admitting top is typically made of plastic, fiberglass, or other relatively rigid translucent or see-through material. The guards are traditionally positioned near the top of a trailer to protect the roof of the trailer from damage during loading and unloading. The translucent portion allows additional light to enter the trailer, reducing the need for external or internally powered lighting for loading and unloading. Ribs 116 on the roof of the trailer 100 support the roof as well as provide a mounting medium for the scaffold 112. The ribs 116 typically provide a raised or domed type of structure for the roof, which makes it difficult to hide cameras anywhere in a traditional trailer.

The scope of camera coverage is shown in general as arcs of camera coverage 122 that overlap each other, providing camera coverage for an entire floor 118 of the trailer 100 for multiple cameras 120 located within the scaffold 112. Typically, five cameras are sufficient to provide full camera coverage for the trailer 100, although it should be understood that additional or fewer cameras may be used without departing from the scope of the disclosure.

To be most effective, the camera or cameras for viewing the interior of the trailer 100 should provide full coverage of the interior. In the embodiment shown in FIG. 1, and the detail shown in FIG. 2, the scaffold 112 is shown mounted to ribs 116 which span the roof 110 of the trailer 100. A two piece scaffold 112 is comprised of top sections 400 and bottom sections 500 as described in further detail below (FIGS. 2, 4, 5, 6).

Referring now to FIG. 3, a view from inside a trailer such as trailer 100 is shown looking toward the top of the trailer. The scaffold 112 is mounted to the ribs 116 that span the roof or top 110 of the trailer 100. Dashed lines indicate internal concealed recesses 302 and channels 304 within the scaffold 112. Pinholes 306 for the pinhole cameras (shown and described below) are placed to coincide with the recesses 302 for the cameras. The cameras are hidden in structure found in typical trailers. The scaffold 112, as has been described, is in one embodiment a pair of sections or portions that are fastened together.

Figure 4:
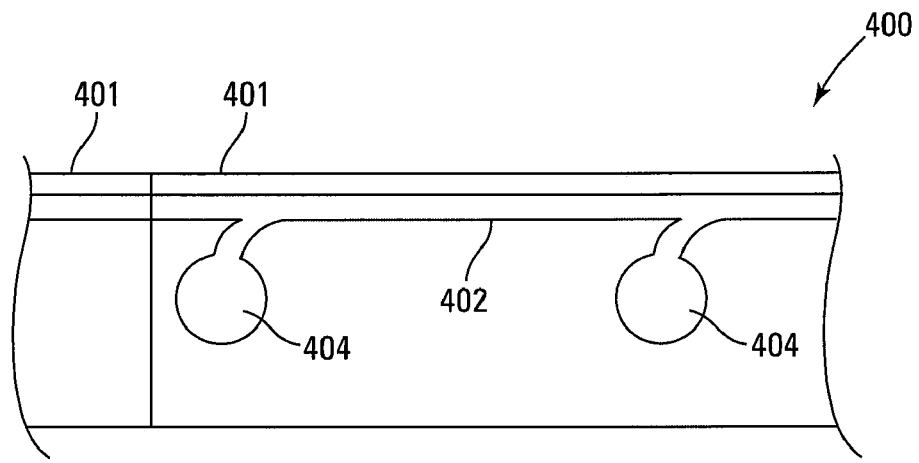
FIG. 4 is a view of an inside of a representative top portion of a camera scaffold according to another embodiment.
Figure 5:
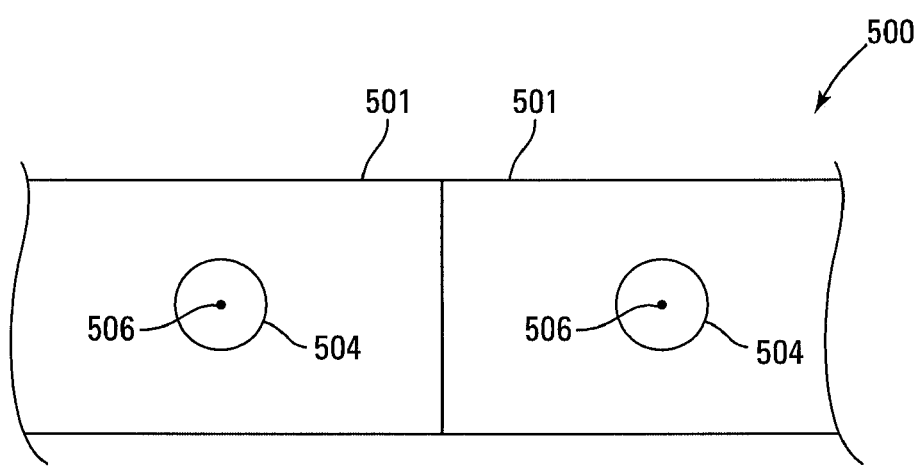
FIG. 5 is a view of an inside of a representative bottom portion of a camera scaffold according to another embodiment.

The portions of the scaffold 112 are shown in greater detail in FIGS. 4 and 5. FIG. 4 shows a typical top portion 400 of a scaffold 112. Top portion 400 has channels 402 and recesses 404 cut into the top portion 400 to provide part of a path for placement of wiring and cameras within a completed scaffold 112. Channels 402 run all the way to the hidden compartment 114 of the trailer, so that the wiring cannot be seen by anyone inside the trailer, except someone who is inside the hidden compartment. In a typical trailer 100, there may be five cameras within a scaffold 112. Therefore, in one embodiment, the portion 400 may be comprised of multiple sections 401 of scaffold 112 employed to span the length of the trailer. In various embodiments, the sections 401 are made of wood such as plywood or other wood, and the channels and recesses are formed by routing with a router or the like. In other embodiments, the scaffold 112 may be comprised of plastic, such as extruded plastic or the like, and the channels and recesses formed during extrusion or routed after extrusion. It should be understood that wood scaffolding is most commonly used in trailers, and as such, a wood scaffold 112 will likely arouse the least amount of suspicion to a would-be thief.

FIG. 5 shows a typical bottom portion 500 of a scaffold 112. Bottom portion 500 has recesses 504 that match up with recesses 404 of top portion 400 when the two portions are connected to form a completed scaffold 112. Pinholes 506 are centered in one embodiment in recesses 504. The bottom portion 500 may be comprised of multiple sections 501 of scaffold 112 employed in one embodiment to span the length of the trailer. The embodiment of FIG. 5 is a specific embodiment of that shown above in FIG. 3.

Mounting of the portions 400 and 500 to form scaffold 112 is shown in greater detail in the cutaway view of FIG. 6. Wiring 602 for connection to cameras 604 is run within channels 402 for the length of the scaffold 112. The wiring runs to the hidden compartment 114 for connection to camera monitoring gear, such as but not limited to a computer, monitor, transmitter, recorder, or combination thereof. The lenses 606 of cameras 604 are aligned with the pinholes 506 of their respective recesses 504. The sections 401 of portion 400 are mounted to the ribs 116 of trailer 100 using suitable fasters such as screws 608. Cameras 604 are positioned adjacent pinholes 506 and fastened into place with suitable fasteners, including glue or other adhesives. The sections 501 of portion 500 are brought near to the mounted sections 401 of portion 400, the recesses 404 and 504 are aligned, wiring 602 is connected to cameras 604, the operability of the cameras 604 is checked, and sections 501 are mounted to sections 401 using suitable fasteners, such as screws 610 or the like. In one embodiment, all holes for the fasteners are pre-drilled so as to avoid channels 402 and recesses 404 and 504, thereby preventing damage to wiring 602 or cameras 604. In another embodiment, the screws are recessed or flush fit to the scaffold 112, and the pinholes can be formed to look like a screw hole. The aligned recesses 404 and 504 form camera compartments 612 in one embodiment. Further, it should be understood that the cameras 604 may be mounted in the camera compartments 612 in either of the recesses 404 and 504 without departing from the scope of the disclosure.

It should be understood that assembly can also be accomplished in whole or in part entirely before mounting the scaffold 112 into trailer 100 without departing from the scope of the disclosure. Further, while the trailer 100 has been described as having a translucent or light admitting roof, it should be understood that a camera scaffold such as scaffold 112 could be mounted on the interior of a trailer without a translucent or light admitting roof without departing from the scope of the disclosure. However, such a scaffold could appear out of place in the trailer, and could alert would-be thieves.

In one embodiment, the sections 401 and 501 of top portion 400 and bottom portion 500 are overlapped so that the seams do not correlate, that is, the sections 401 of the top portion 400 and the sections 501 of the bottom portion 500 are joined at non-overlapping seams. That is, where there is a seam between two sections 401, there is no seam for sections 501, and where there is a seam between two sections 501, there is no seam for sections 401. This can improve structural stability of the scaffold 112, and is shown as seams 612 between adjacent sections 401 and seams 614 between adjacent sections 501 in FIG. 6.

The pinholes 506 are typically very small, as the lenses 606 used by cameras 604 are very small. In one embodiment, pinhole cameras are used, which can operate with an opening of no more than a millimeter or two. In other embodiments, pinholes 506 are concealed within false screws or the like to further prevent detection. Various concealments of the pinholes within the guard or scaffold 112 will be understood by those of skill in the art, and are within the scope of the disclosure and embodiments.

For example, in another embodiment, a trailer having a normal non-translucent roof could use a false roof portion concealing hidden cameras and wiring for the cameras. Due to the small size of cameras and their associated wiring, such a trailer could provide a concealed camera mounting with a false roof very close to the actual roof without alerting would-be thieves of the presence of cameras. Similar pinholes could be used in the false ceiling to allow camera positions to view the interior of the trailer.

While embodiments have been described including pinholes and recesses in one portion and channels and recesses in another portion, it should be understood that the placement of channels, recesses, and pinholes may be changed without departing from the scope of the disclosure. For example, one section could contain all the channels, recesses, and pinholes, or any combination thereof, provided the pinholes are properly oriented to allow camera coverage of the appropriate portions of the interior of the trailer.

CONCLUSION

A hidden camera platform, comprising a first and a second half, the first and second halves defining at least one channel and at least one camera opening having a camera pinhole, a camera, and wiring for the camera, the first and second halves fitting together to appear as a single guard for a trailer Although specific embodiments have been illustrated and described herein it is manifestly intended that the scope of the claimed subject matter be limited only by the following claims and equivalents thereof.

What is claimed is:

1. A sting trailer, comprising:
   a translucent roof portion admitting light to the sting trailer;
   a guard element to protect the translucent roof portion, the guard element containing at least one camera and wiring for the at least one camera;
   wherein the guard element further comprises a first portion and a second portion, the first portion having at least one channel running from a first end to at least one first portion recess on a side of the first portion, the second portion having at least one second portion recess matching the at least one first portion recess, the at least one second portion recess having an opening for placement of the at least one camera and a pinhole;
   wherein the first portion and the second portion fit together to form the guard element and wherein the at least one first portion recess, the at least one second portion recess, the wiring, and the at least one camera are concealed from view;
   wherein the guard element is comprised of wood; and,
   wherein the at least one channel, the at least one first portion recess, and the at least one second portion recess are routed in the wood.

2. The sting trailer of claim 1, wherein the at least one channel is an internal channel.

3. The sting trailer of claim 1, wherein the at least one channel is not visible when the guard element is assembled.

4. The sting trailer of claim 1, wherein the at least one channel, the at least one first portion recess, and the at least one second portion recess are internal to the guard element when the guard element is assembled.

5. The sting trailer of claim 1, wherein the translucent roof portion includes supporting ribs, and the guard element is mounted to the supporting ribs.

6. A method of constructing a sting trailer, comprising:
   providing a translucent roof portion admitting light to the sting trailer;
   providing a guard element to protect the translucent roof portion, the guard element containing at least one camera and wiring for the at least one camera;
   wherein the guard element further comprises a first portion and a second portion, the first portion having at least one channel running from a first end to at least one first portion recess on a side of the first portion, the second portion having at least one second portion recess matching the at least one first portion recess, the at least one second portion recess having an opening for placement of the at least one camera and a pinhole;
   wherein the first portion and the second portion fit together to form the guard element and wherein the at least one first portion recess, the at least one second portion recess, the wiring, and the at least one camera are concealed from view;
   wherein the guard element is comprised of wood; and,
   wherein the at least one channel, the at least one first portion recess, and the at least one second portion recess are routed in the wood.

7. The method of claim 6, wherein the translucent roof portion includes supporting ribs, and the guard element is mounted to the supporting ribs.

8. The method of claim 6, and further comprising:
   mounting a plurality of cameras in the guard element, each camera having a lens aligned with one of a plurality of pinhole openings formed in the guard element; and
   providing wiring to connect each camera of the plurality of cameras to an external controller, the wiring positioned in the at least one channel opening.

9. The method of claim 6, wherein the first portion and the second portion each comprise a plurality of sections, the sections joined to adjacent sections at non-overlapping seams.

10. A sting trailer, comprising:
    a hidden compartment containing surveillance equipment, at least a portion of the hidden compartment being disposed in an interior of the sting trailer;
    a cargo-carrying compartment having a roof with supporting ribs, the cargo-carrying compartment forming a portion of the interior of the sting trailer, the cargo-carrying compartment being operably associated with the hidden compartment such that the hidden compartment is not visible from the cargo-carrying compartment; and
    a camera platform mounted to the roof, the camera platform concealing a plurality of cameras operatively connected to the surveillance equipment, at least a portion of the camera platform being disposed in the cargo-carrying compartment.

11. The sting trailer of claim 10, wherein the camera platform further comprises a scaffold having internal camera compartments with pinhole openings, and internal wiring channels.

12. The sting trailer of claim 11, wherein the camera platform further comprises: a top portion and a bottom portion that fit together, the top portion having a top portion internal side, the top portion internal side having a plurality of top portion camera recesses and a plurality of wiring channels, and the bottom portion having a bottom portion external side and a bottom portion internal side, the bottom portion internal side having a plurality of bottom portion camera recesses each having one of the pinhole openings for a camera, each pinhole opening extending from the bottom portion camera recess to the bottom portion external side.

13. The sting trailer of claim 12, wherein the top portion and the bottom portion are constructed of wood.

14. The sting trailer of claim 12, wherein the top portion is mounted to the supporting ribs, and the bottom portion is mounted to the top portion.

15. A method of constructing a sting trailer, comprising:
providing a hidden compartment containing surveillance equipment, at least a portion of the hidden compartment being disposed in an interior of the sting trailer;
providing a cargo-carrying compartment having a roof with supporting ribs, the cargo-carrying compartment forming a portion of the interior of the sting trailer, the cargo-carrying compartment being operably associated with the hidden compartment such that the hidden compartment is not visible from the cargo-carrying compartment; and
providing a camera platform mounted to the roof, the camera platform concealing a plurality of cameras operatively connected to the surveillance equipment, at least a portion of the camera platform being disposed in the cargo-carrying compartment.

16. The method of claim 15, and further comprising;
adjoining a top portion and a bottom portion to form at least a portion of the camera platform, the camera platform having at least one internal channel and a plurality of internal camera placements connected to the at least one internal channel;
mounting a camera in each of the plurality of internal camera placements; and
routing wiring for each camera through the at least one internal channel to an external camera controller.

17. The method of claim 15, and further comprising:
mounting the camera platform to ribs of a roof of the sting trailer.

18. The method of claim 17, wherein mounting the camera platform further comprises mounting a top portion to the ribs, connecting each camera to its respective wiring, and mounting a bottom portion to the top portion.

* * * * *